Aug. 25, 1942.  L. DE FLOREZ  2,293,889
AUTOMATIC CONTROL OF MOVING CRAFT
Filed April 30, 1937  7 Sheets-Sheet 1
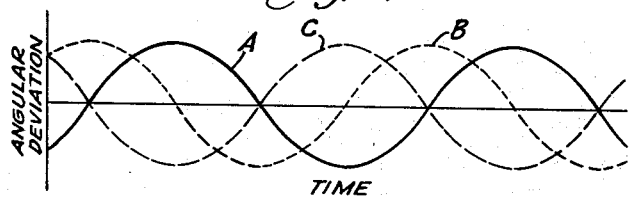
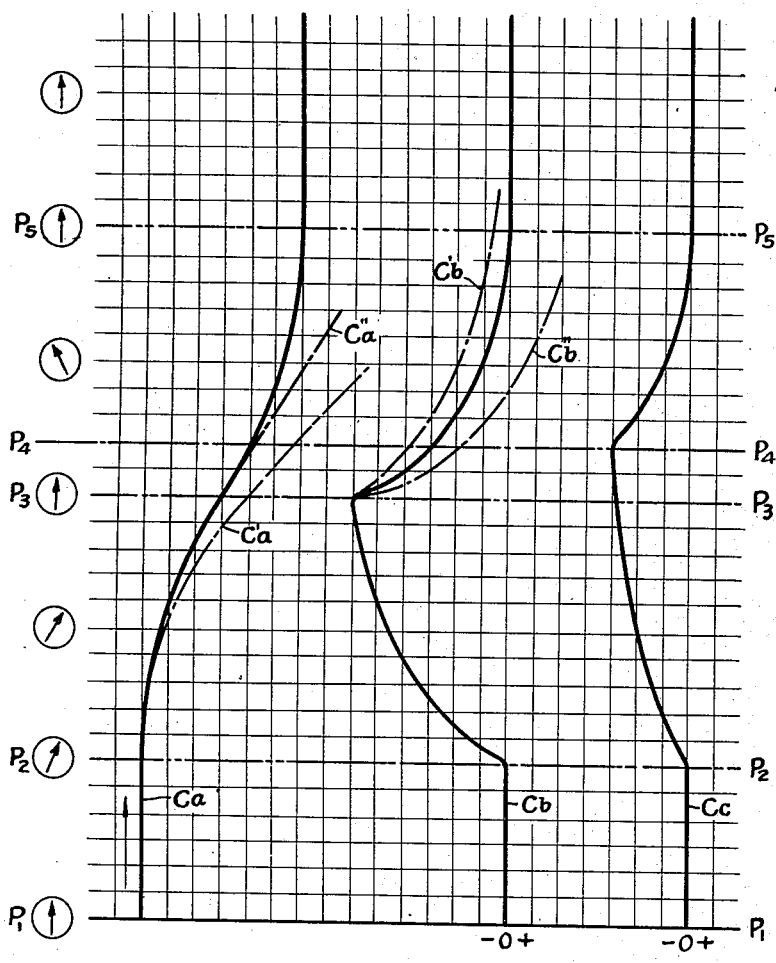
LUIS DE FLOREZ
INVENTOR
BY *Philip S. McLean*
ATTORNEY

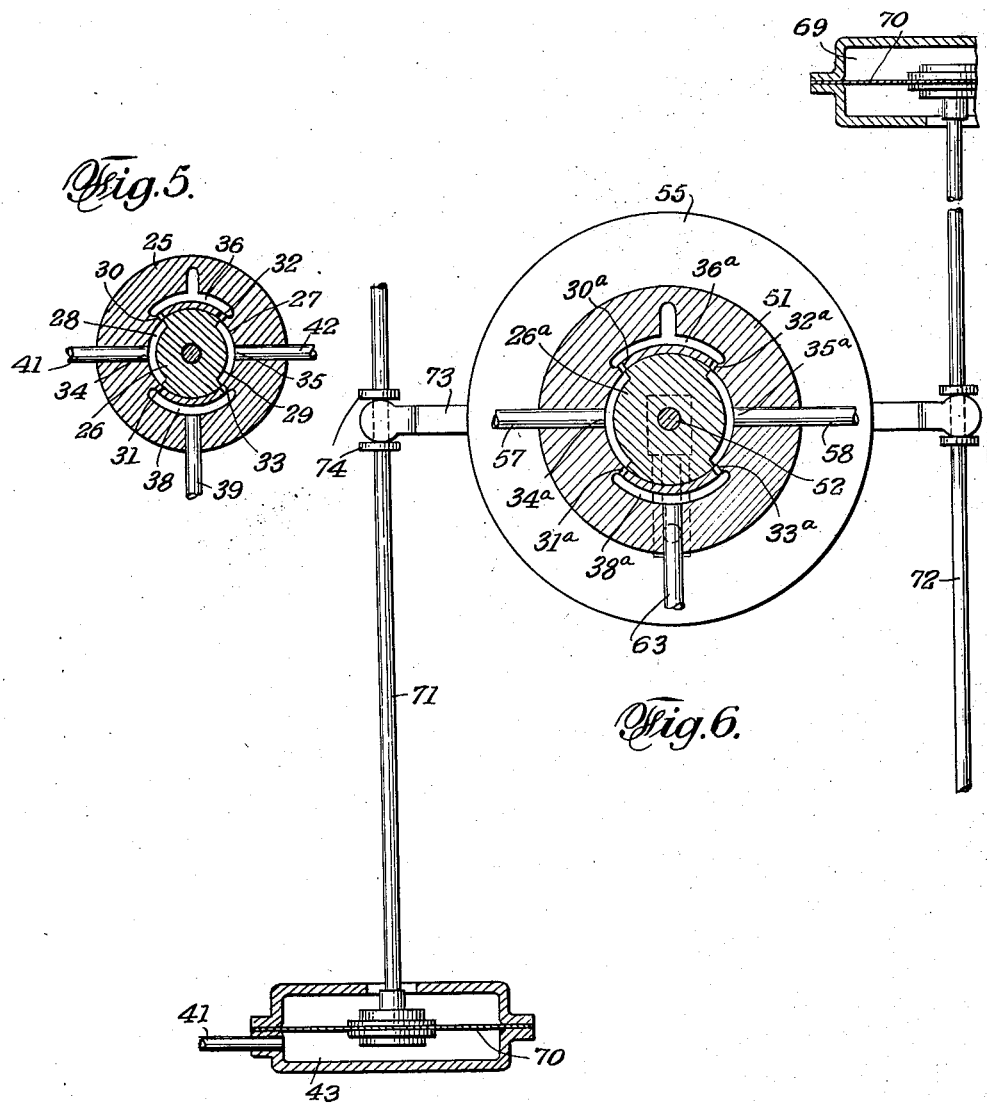

Aug. 25, 1942.   L. DE FLOREZ   2,293,889
AUTOMATIC CONTROL OF MOVING CRAFT
Filed April 30, 1937   7 Sheets-Sheet 4
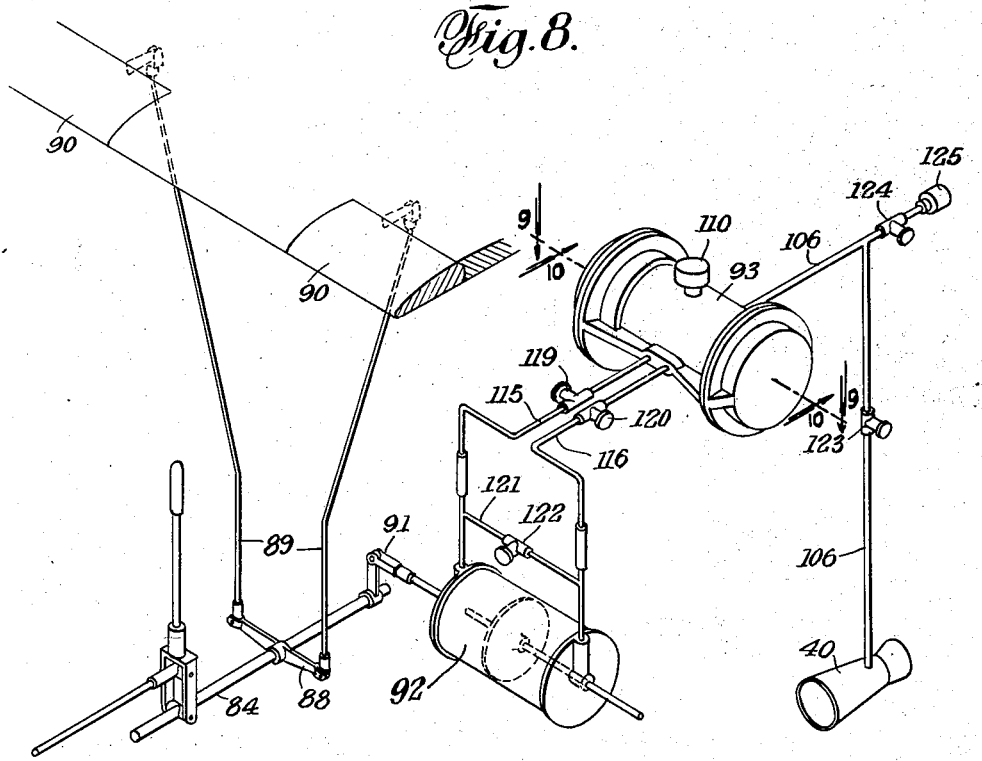
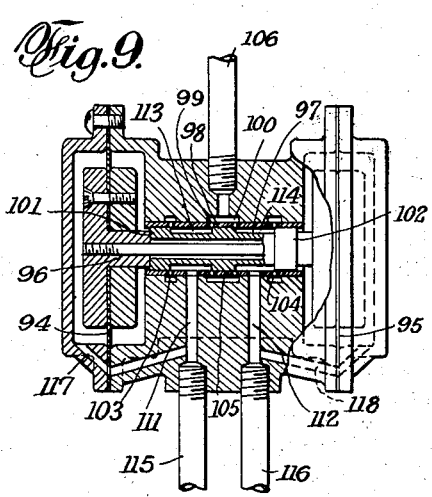
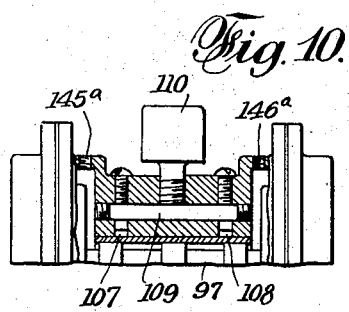
LUIS DE FLOREZ
INVENTOR
BY
ATTORNEY Aug. 25, 1942.   L. DE FLOREZ   2,293,889
AUTOMATIC CONTROL OF MOVING CRAFT
Filed April 30, 1937   7 Sheets-Sheet 5
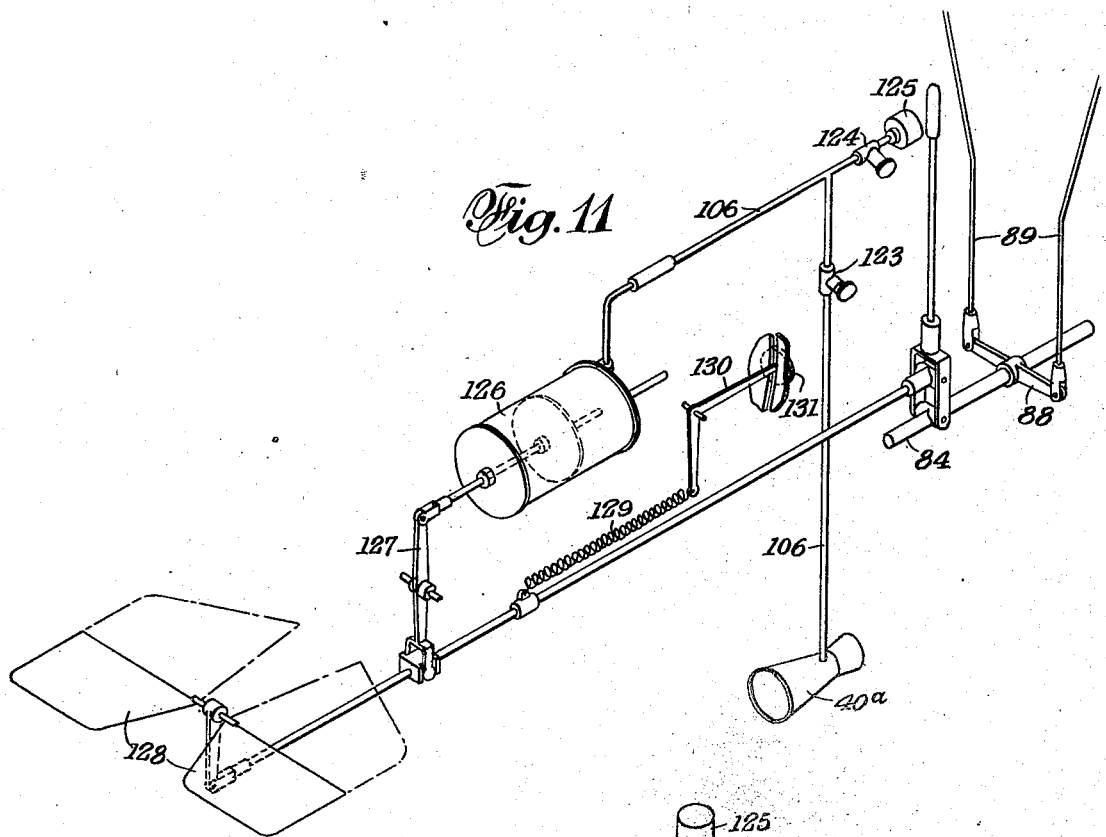
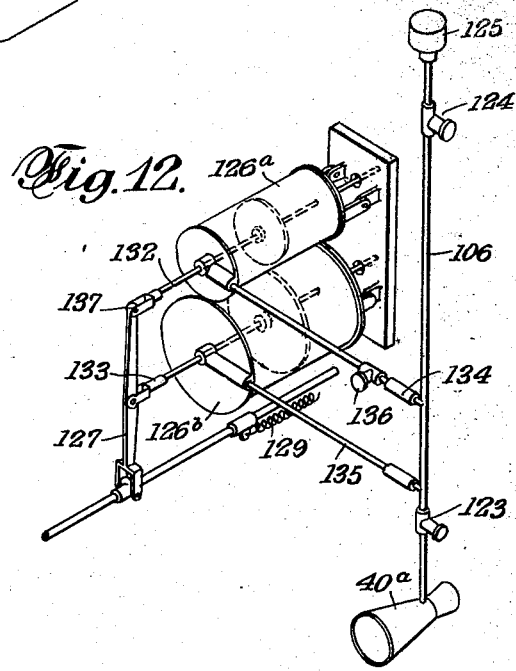
LUIS DE FLOREZ
INVENTOR
BY 
ATTORNEY

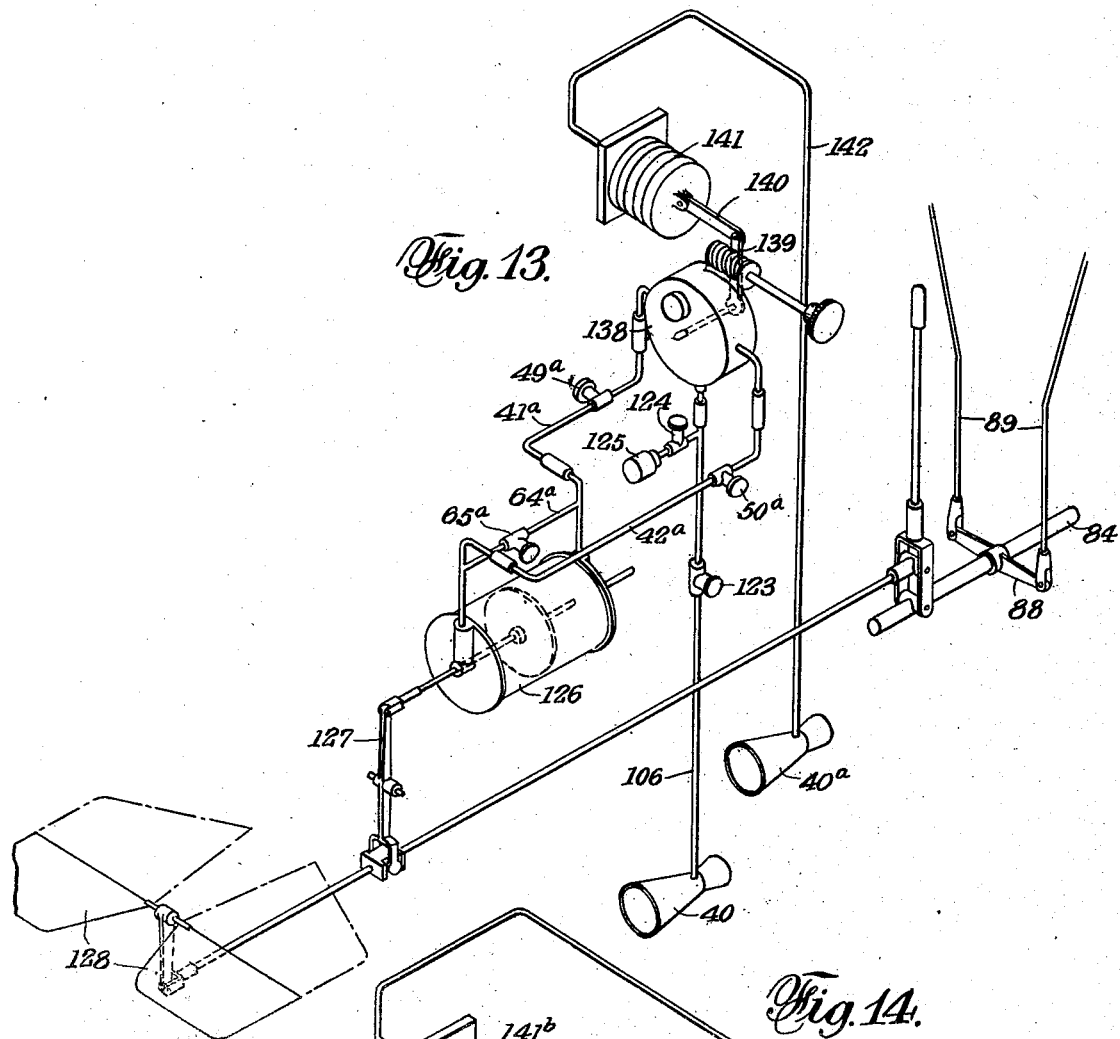
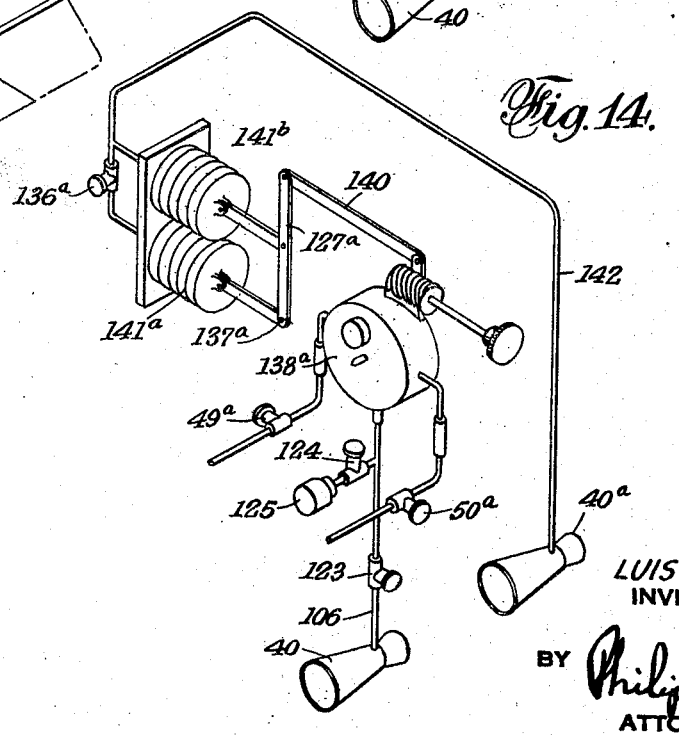

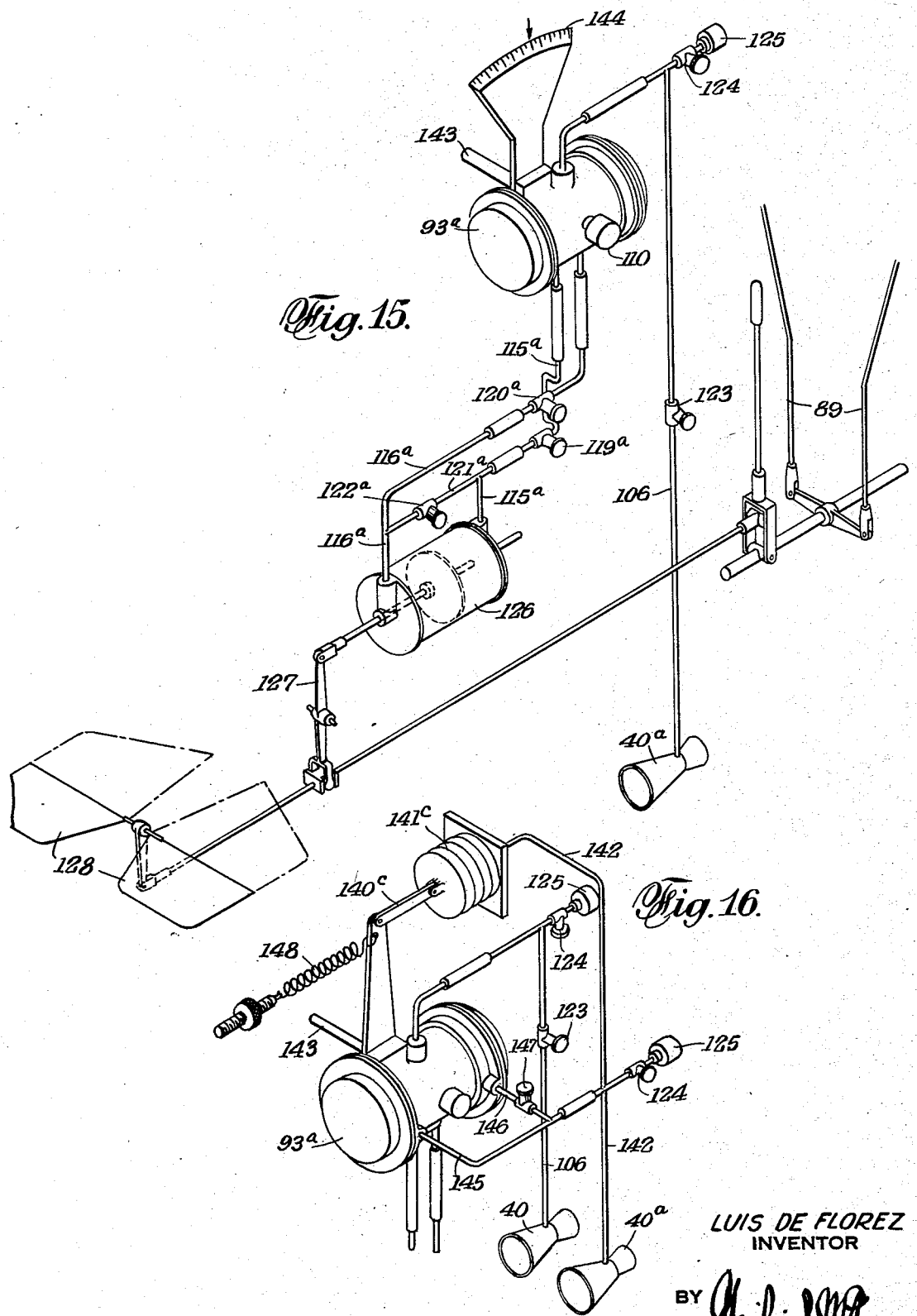

Patented Aug. 25, 1942

2,293,889

UNITED STATES PATENT OFFICE 2,293,889

AUTOMATIC CONTROL OF MOVING CRAFT

Luis de Florez, New York, N. Y., assignor to National Aviation Research Corporation, New York, N. Y., a corporation of Delaware Application April 30, 1937, Serial No. 139,868

21 Claims. (Cl. 244—78)

The invention disclosed herein relates to the control of moving craft of various types, more particularly aircraft.

In the control of moving craft, it is desirable generally to recognize at once any deviation from course or attitude and to immediately put into effect the necessary corrective measure for restoring the craft to course and normal attitude.

These corrections when effected manually necessarily depend upon the pilot to recognize or perceive the deviation and to then take the appropriate steps to effect the required control action. The effectiveness of the correction is thus dependent upon the attention and skill of the pilot first in detecting the need for correction and in initiating the corrective measures with the required promptness and force to quickly arrest the change and start the craft back toward the true course and/or attitude, and to then ease off the control on approach to normal to just bring the craft back to the desired course or attitude. A skillful and attentive pilot may thus quickly correct deviation without over-control and objectionable "hunting" effects.

In so doing, the pilot takes into account and makes allowance for the varying factors of rate of change, acceleration and extent of deviation.

Special objects of the present invention are to accomplish an equivalent or even more effective control by wholly automatic means.

Automatic systems of control have been proposed heretofore, but these when sufficiently sensitive have had a tendency to over-control or create objectionable hunting. To overcome this, such systems have been in effect desensitized and made self-damping. This however, has had the effect of rendering them somewhat sluggish in action, and in some instances has accentuated hunting.

Further objects of the present invention are to combine sensitive action with promptness and force of control and accurate return to the desired course or attitude.

In addition to the objects heretofore mentioned, it is a purpose of the invention to provide apparatus for accomplishment of the above, which will be simple, reliable, practical and efficient, relatively inexpensive and readily applicable to existing aircraft.

Further objects and the novel features of the invention are set forth or will appear in the course of the following specification.

The drawings accompanying and forming part of the specification illustrate certain practical embodiments of the invention as applied to aircraft, but such illustration is primarily by way of disclosure and various modifications and changes may be made as will be apparent from the intent and broad scope of the claims.

Fig. 1 is a diagram representing graphically the desired control effect for bringing a craft back to course after an off-course disturbance.

Fig. 2 is a diagram representing the factors of deviation, rate of change and acceleration necessary to be considered.

Fig. 3 is a diagrammatic picturization of course, turn indication and variable pressures exercised in checking an off-course movement and bringing a craft back to the line of flight.

Fig. 5 is an enlarged broken vertical sectional detail of the differential air control valve actuated by the turn gyro, as on line 5—5 of Fig. 4.

Fig. 6 is a broken horizontal sectional detail of the differential control valve operated by the acceleration detector, substantially as on line 6—6 of Fig. 4.

Fig. 7 is a broken sectional detail of the adjustable pick-up for aileron control as on substantially the plane of line 7—7 of Fig. 4.

Fig. 8 is a schematic broken and part sectional view of a modified form of aileron control.

Figs. 9 and 10 are broken sectional details of the automatic control valve employed as on lines 9—9, 10—10, of Fig. 8.

Fig. 11 is a broken perspective illustration of an embodiment of the invention for automatic control of pitch and climb.

Figs. 12, 13, 14, 15 and 16 are similar views of modified forms of such control.

Figure 4:
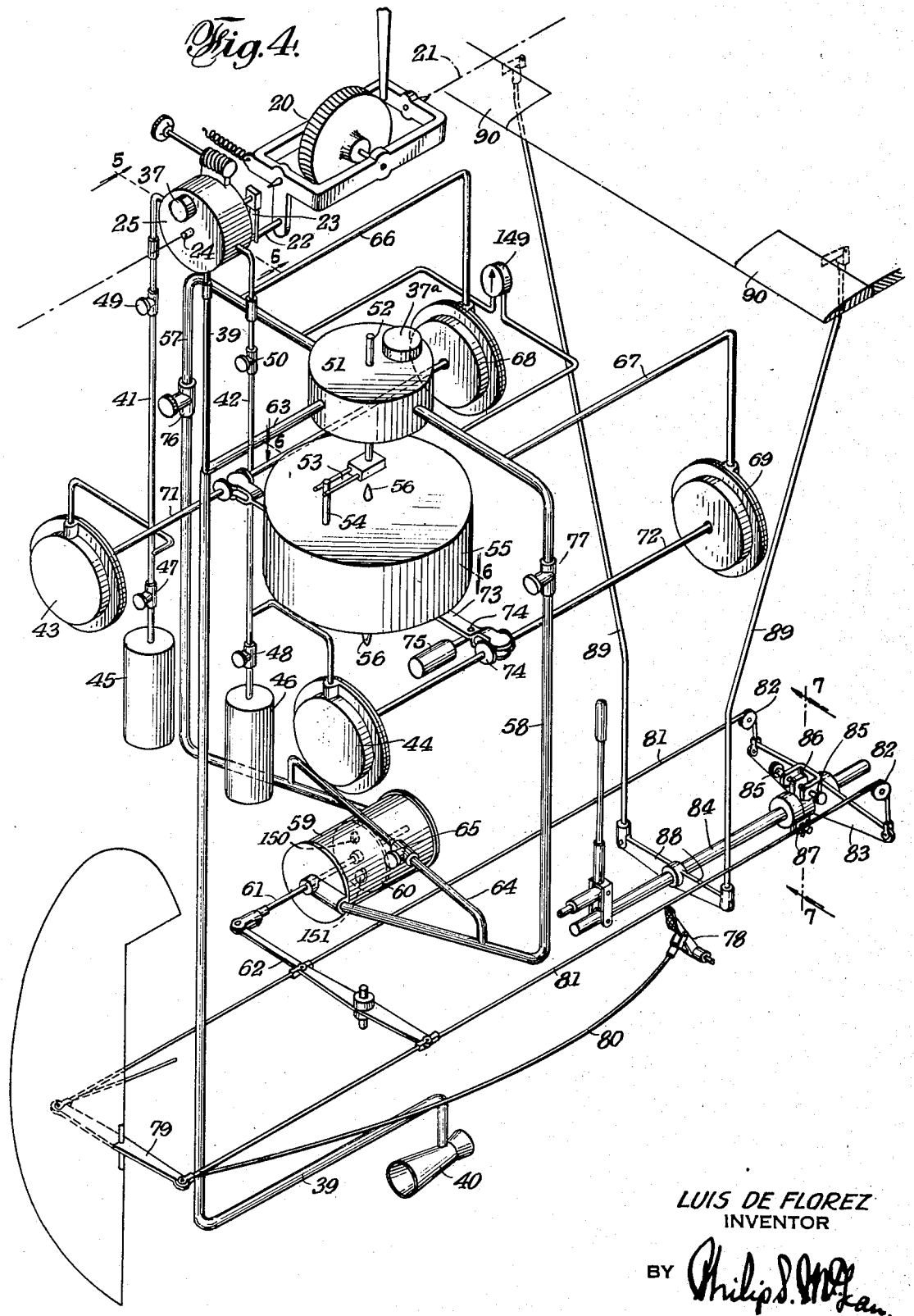
Fig. 4 is a perspective, diagrammatic, broken and part sectional view illustrating one embodiment of mechanism for combined steering and aileron control of an airplane.

In the present invention, instead of desensitizing to make the control self-damping, the sensitivity is retained so as to automatically and instantly detect any variations, and modifying influences are introduced to prevent oscillation or hunting. An ideal control effect would be one such as represented in Fig. 1, where curve a, resembling an asymtote represents the return of the craft to the original course after a disturbance. In this view, the position b or any point along the curve represents the angular deviation from the desired course and not the linear deviation. In this curve, the maximum control is exerted at the beginning where the deviation is greatest and this is tapered off at a proper rate to bring the craft back into the desired line of flight without hunting.

If control is effected only with reference to direction and extent of deviation, the course of a craft, as an airplane, may be such as that represented by the curve A in Fig. 2, for simple harmonic motion and the equation for which is:

$$x = r \sin wt$$

where $x$ represents the angular deviation, $t$ represents time and $r$ and $w$ are constants.

The curves B and C in this view representing respectively the rate of deviation and the change of rate or acceleration are derived from the equations $$dx/dt = wr \cos wt$$

and $$dx^2/dt^2 = -w^2 r \sin wt$$

To accomplish the effect illustrated in Fig. 1 therefore, it becomes necessary to coordinate the results of these three functions of deviation, rate of deviation and change of rate or acceleration and in the proper sign and magnitude.

In the present disclosure, the rate of deviation about any particular axis is determined or detected by the rate of turn gyroscope and this is utilized to create or cause differential air pressures proportional to the rate of deviation. These differential air pressures are in turn caused to act upon a power cylinder, which effects operation of the rudder in a direction to oppose the turning movement.

During such unbalancing of pressures, a pressure difference is built up in two integrating tanks, connected with the power cylinder, which difference is proportional to the rate and time of the deviation. As the craft returns to its original course, the pressures in these integrating tanks become equalized. Thus during a disturbance and subsequent correction, the pressures in these integrating or so-called "think tanks" will modify the first controlling influence by an amount proportional to the deviation.

Fig. 3 illustrates this effect of the integrating tanks of "remembering" that the craft is off-course and how much and modifying the action of the power cylinder at the right rate and extent to bring the craft back to the proper course. In this view, the line $C_a$ represents the path of the craft during a disturbance and subsequent restoration to course, curve $C_b$ the differential pressure within the power cylinder and $C_c$ the differential pressure within the integrating tanks. The row of dials at the left shows the position of the rate of turn gyro and hence of the sensitive control valve actuated thereby at different instants.

In explanation, it may be considered that at point $P_1$, the craft is proceeding in the direction of the arrow, the pressures are balanced in the power cylinder and integrating tanks, and the gyro indicates no turn. At $P_2$ a disturbance has sent the craft into a right turn, the gyro shows right turn and differential pressures of minus sign are started building up in the power cylinder and integrating tanks with a corresponding movement of the rudder. Without the immediate correcting effect of the power cylinder on the rudder, it may be assumed that the craft would probably have deviated somewhat more, as along the broken line $C'_a$.

During the whole period $P_2$—$P_3$ the craft is in a right turn and differential pressures (lines $C_b$ and $C_c$) continue building up in the power cylinder and integrating tanks.

At $P_3$ the turn of the craft has been fully arrested and at this instant, before a left turn has begun, the gyro indicates no turn. To fully appreciate the subsequently explained operation, it might be assumed for the instant, that the craft continued on a course tangent to $P_3$ as indicated by broken line $C''_a$. The gyro would then continue to indicate zero, the control valve actuated thereby would be balanced and pressures in the power cylinder would tend to become equalized along the broken curve indicated at $C'_b$. However, immediately the craft starts in its turn to the left from continued influence of the rudder, the gyro shows left turn and the control valve positioned thereby strives to effect a reversal of sign in the differential of pressure in the air cylinder, thus accelerating reduction or collapse of the differential pressure. The broken curve $C''_b$ indicates the path the pressure would follow if uninfluenced by the integrating tanks. The differential pressure of these tanks as shown by curve $C_c$ rose during the period $P_2$—$P_3$ simultaneously with curve $C_b$, but continued to rise, though at a reduced rate during $P_3$—$P_4$, while $C_b$ was falling. At $P_4$ the differential pressure in the air cylinders and integrating tanks are equal and immediately thereafter the curve $C_c$ reverses direction and starts falling. As a result, the slope of curve $C_b$ is modified, falling in between curves $C'_b$ and $C''_b$.

During the period $P_4$—$P_5$, the curves $C_a$ $C_b$ and $C_c$, each influenced by the others show the gyro and control valve returning to zero in smooth gradations, the left turn of the craft instituted to offset the original disturbance becoming slower and slower and the pressures in the air cylinder and integrating tanks being gradually restored to balance. At $P_5$ the disturbance has been compensated for and the craft has been brought back to the original line of flight or substantially so, after the pattern of the ideal control curve, Fig. 1.

In addition to this modifying effect for deviation, a modifying control for acceleration about any given axis, may be provided. This is accomplished in the present disclosure by a cylindrical mass mounted on frictionless bearings on the vertical axis of the craft and providing mechanical pressure proportional to acceleration for control purposes through diaphragms or equivalent.

In the structural embodiment illustrated in Fig. 4, a precessional gyroscope is indicated at 20, having two degrees of freedom and the gyroscopic force of which is proportional to the rate of deviation from a given course. The precessional frame of this gyro is pivoted on a line 21, corresponding to or parallel with the longitudinal axis of the craft and carries a pin 22, engaging in a forked lever arm 23, dependent from rock shaft 24, journalled in casing 25, of a sensitive differential air control valve.

This valve is shown placed substantially vertically with the shaft substantially horizontal and the shaft is shown as carrying a generally cylindrical valve element 26, Fig. 5, operating freely in a cylindrical valve chamber 27, in valve casing 25. The cylindrical valve element is shown as having segmental recesses 28, 29, in opposite sides of the same, registering equally in the intermediate position shown, with top and bottom ports 30, 31 and 32, 33, as well as with intermediate side ports 34, 35 in the valve casing. The upper pair of ports 30, 32 lead from an arcuate top chamber 36, open to atmosphere through an air filter 37, Fig. 4. The lower ports 31, 33 lead from an arcuate chamber 38, connected by suction tubing 39, with a venturi 40. The two side ports 34, 35 are shown connected by tubing 41, 42 with diaphragm chambers 43, 44.

The integrating tanks for modifying the control in accordance with extent of deviation are indicated at 45, 46, connected in on lines 41, 42, through control orifices or restrictions, such as adjustable valves 47, 48. Other variable restrictions may be provided in these lines as indicated at 49, 50, and if desired, the two lines may be coupled by a valved cross connection, which when the valve is open will balance and hence in effect short circuit the control valve to render the entire mechanism inoperative.

A second, sensitive differential control valve operable in response to acceleration of turning movement is indicated in Fig. 4, with the casing of the same at 51, located horizontally and the shaft 52, arranged vertically and carrying at the lower end forked operating lever 53, engaged by pin 54, on the acceleration detecting inertia wheel 55, journalled on frictionless bearings on vertical axis 56.

The acceleration controlled valve, as indicated in Fig. 6, is similar in construction, but may be somewhat larger in size than the turn controlled valve. The side ports 34a, 35a, of this acceleration susceptible valve are shown connected by piping 57, 58, with opposite ends of a power cylinder 59, containing a piston 60, connected by a rod 61, with rudder control bar 62. The upper or air inlet chamber 36a of the valve is shown equipped with an air filter 37a, and the lower, suction chamber 38a, is shown connected by piping 63—39 with venturi 40.

This one venturi thus provides power for the rudder operating air cylinder, modified and controlled by the two sensitive control valves, but while this is a desirable combination, it will be appreciated that suction pumps may be used or that with appropriate changes, positive pressure may be employed, supplied for example by Pitot tubes, air compressors, or the like.

The lines 57, 58, running to opposite ends of the power cylinder are shown as connected by a cross line 64, having a valve 65, therein, normally closed during operation of the system, but which may be partly or wholly opened, either to modify the operation in the first instance or to entirely balance opposite ends of the cylinder to render the system inoperative.

Extending from the two main air lines 57, 58, are indicated branch lines 66, 67, connected with diaphragm chambers 68, 69, similar and opposite to the diaphragm chambers 43, 44. The diaphragms 70 in the opposite chambers are shown connected by rods 71, 72, and these rods are hooked up with the acceleration wheel 55, by a cross lever 73, carried by or fixed to said wheel and having forked ends engaged between spaced collars 74, on the rods.

With the system in operation and the craft proceeding along the desired course, both sensitive control valves are in the neutral positions indicated in Figs. 4, 5 and 6, pressures are balanced and the rudder is held neutral. If there occurs a disturbance causing the craft to turn to the right the inertia wheel 55 causes an initial relative rotation of the valve elements 26a in a counter-clockwise direction whereby ports 31a and 32a are further opened and ports 30a and 33a further closed and pressure in line 66 and diaphragm chamber 68 becomes nearer suction pressure while that in line 67 and chamber 69 becomes nearer atmospheric pressure. The differential of pressure acting on the diaphragms 70 in chambers 68 and 69 produces a differential mechanical pressure equal and opposite to the force caused by the inertia wheel 55.

Simultaneously the frame of the gyro 20 precesses in a counter-clockwise direction moving valve element 26 also in the same direction. In so doing ports 31 and 32 are further opened and ports 30 and 33 further closed and pressure in line 41 becomes nearer suction pressure while that in line 42 becomes nearer atmospheric pressure.

Due to the presence of integrating tanks 45 and 46 and the adjustable restrictive orifices 47 and 48 and 49 and 50, the differential of pressure in chambers 43 and 44 is not proportional to the rate of deviation but is modified by an amount proportional to the amount of deviation, as follows. Flow of air along the lines 41 and 42 between the rate controlled valve and chambers 43 and 44 is restricted by orifices 49 and 50 and hence the pressure difference in 43 and 44 lags somewhat the pressure difference at the control valve. Likewise due to orifices 47 and 48 the pressure difference in integrating tanks 45 and 46 lags somewhat that of the chambers 43 and 44. It will be seen that the differential pressure in the tanks 45 and 46 is then a measure of the rate and the time and hence a measure of the deviation. As the turn of the craft is arrested after a disturbance but before it has been returned to its original course, there exists a differential pressure in the tanks 45 and 46, while at this moment the rate controlled valve will be in the neutral position. Now as the craft swings in the opposite direction to get back to the original course and the gyro swings accordingly, the flow of air through orifices 49 and 50 is reversed and immediately following, the flow through 47 and 48 is also reversed tending to maintain the differential pressure in chambers 43 and 44 until the craft has resumed its former course.

This differential pressure exerted on diaphragms 70 in the chambers 43 and 44 produces a differential mechanical pressure acting in the same direction as that produced by the inertia wheel 55 thereby still further opening ports 31a and 32a and still further closing ports 30a and 33a of the acceleration controlled valve and thus increasing the pressure differential in chambers 68 and 69 by an amount sufficient to counterbalance this added force.

Differential pressure equal to that of chambers 68 and 69 is transmitted to cylinder 59, and the rudder caused to move by an amount proportional to the combined effect of the deviation, rate and acceleration.

If the turn caused by the disturbance is one of constant angular deviation, the differential pressure due to the effect of the inertia wheel 55 falls to zero after its initial effect and the regulatory action is proportional to the deviation and rate alone. As the turn of the craft is arrested the effect due to inertia wheel 55 is reversed and opposed to that of the rate of turn controlled valve and integrating tanks and the return of the craft to its original course is tempered and overshooting prevented.

To avoid oscillation of the acceleration detecting mass 55, the movement may be damped as by connecting the lever 73, with a dash pot as indicated at 75, in Fig. 4. As an alternative or in conjunction with such control, valves 76, 77, may be placed in the lines 57, 58, which would prevent the effect of oscillations of the mass and of the valve controlled thereby from reaching the power cylinder 59.

As described, the automatic control system is entirely pneumatic. This is an advantage from the standpoint of simplicity and from the fact that the necessary power is derived simply from movement of the plane. A further advantage is that with such a force, the manual controls may be used at any time to over-power and supersede the automatic control, without delaying to shut off the automatic control or to render it inoperative, as by fully opening the valved by-pass for connecting and balancing opposite sides of the system.

To permit the automatic system to take over full control of the rudder automatically when the pilot relinquishes such control, the arrangement shown in Fig. 4 may be employed. Here the rudder pedals indicated at 78, are connected with the rudder bar 79, by cables 80, which go slack from the tilting back of the pedals as soon as pressure is removed from such pedals. Thus whenever the pilot takes his feet off the rudder pedals, the rudder is left free to be entirely controlled by the automatic system.

Where deviations from course are inclined to be abrupt or extreme, it may at times be desirable to exercise corrective influence of the ailerons. For this purpose, there is shown in Figs. 4 and 7, a pickup connection between rudder and aileron actuating mechanism, comprising cables 81, extending forwardly from the rudder operating bar 62, over pulleys 82, for actuating a rocker bar 83, pivoted on the main control shaft 84, and carrying adjustable screw abutments 85, to engage the opposite sides of a lever arm 86, secured on the control shaft by split clamp 87. When the lever element 86 is fixedly secured on the shaft by clamp 87, and the abutment screws 85, are properly adjusted, the movements of rocker 83, from the rudder control bar will have the effect of rocking the control shaft and this through the lever arms 88 and linkage 89, will shift the ailerons 90, in proper direction and extent to aid the rudder in holding and bringing the ship back to course. By properly setting abutment screws 85, the aileron control can be cut into service for any desired movement of rudder and upon entirely retracting these screws or by loosening clamp 87, this supplementary aileron operation may be cut out of service.

Figs. 8, 9 and 10 illustrate an embodiment of the invention for maintaining proper lateral attitude in straight flight and proper banking angle in the turns. In this particular illustration, the control shaft 84, is rocked through leverage connections 91, from a transversely disposed power cylinder 92, governed by a horizontal transversely positioned automatic control valve 93, having weighted diaphragms 94, 95, at the opposite ends of the same connected together at 96, and carrying between them a sliding valve 97, having an intermediate valve head 98, controlling valve ports 99, 100, and end valve heads 101, 102, controlling valve ports 103, 104. The intermediate valve ports 99, 100, are connected through annular chamber 105, with a suction line 106, and the end ports 103, 104, connected by way of annular chambers 107, 108, Fig. 10, with an air inlet passage 109, protected by an air filter 110. Ports 111, 112, opening to the reduced portions 113, 114, of the movable valve element are connected by piping 115, 116, with the opposite ends of power cylinder 92, and passages 117, 118, lead from such ports to the far or outer sides of the diaphragms 94, 95.

Response control valves 119, 120, are shown in the lines 115, 116, leading to the power cylinder and these two lines are shown connected by a by-pass line 121, provided with a valve 122, which may be partly or entirely opened to modify the action or completely balance and render the power cylinder inoperative. A control response valve is indicated at 123 in the suction line 106, for modifying the effect of the venturi 40, and this same line is shown provided with a valve 124, for opening up the suction line to atmosphere through an air filter 125, thus to modify or render the venturi wholly ineffective on the control valve.

In level stright flight, the parts will stand as in Fig. 9 and suction be applied equally to opposite ends of the power cylinder to hold the ailerons neutral as in Fig. 8, with an incline to one side, say to the right, the weight on the diaphragms will cause them to shift to the right, carrying valve 97, in a direction for closing ports 100 and opening ports 99 to suction. At the same time, ports 103 are closed or more nearly closed and ports 104 are more nearly opened to atmosphere. With this, increased suction is applied through passages 111—117 and reduced suction or approach to atmospheric pressure through passages 112—118, and the differential pressure on the diaphragms is sufficient to counterbalance the effect of gravity. This differential pressure transmitted to the power cylinder through lines 115 and 116 causes the rock shaft 84 to be turned anticlockwise and to raise the left and lower the right aileron to return the craft to a level attitude.

Incorrect banking which would cause "skidding" or "slipping" has a similar effect on the control valve 93. Thus during a right turn of insufficient bank, centrifugal force causes the diaphragms and sliding valve to move to the left and force to be applied by the power cylinder on the ailerons to bring the craft into proper bank.

In Fig. 11, proper longitudinal attitude is automatically maintained through a power cylinder 126, connected by a link and lever system 127, with the elevators 128. The forward end of this cylinder is connected by suction line 106, with a venturi 40a, which in this instance, serves the purpose of a vacuum pump and in addition, is utilized for speed sensitive purposes. The force created by this venturi is counterbalanced by spring 129, the strength of which is governed by regulation of bell crank 130, which can be secured at various adjustments at the quadrant 131. With the proper adjustment once made, the ship will be automatically maintained on substantially level flight, for if the craft starts to nose down, the consequent increase in speed will exert increased suction on the forward side of the piston to turn the elevators upward and if the ship starts to nose up, with reduced suction, the spring 129, will pull the elevators down to raise the tail, preventing stalling and thus keeping the ship in the proper longitudinal flying attitude.

If in this construction the automatic control is rendered inoperative as by opening valve 124, to cut out the power cylinder, the tension of spring 129, may be correspondingly released at 131.

Fig. 12 illustrates a modification of the longitudinal attitude control mechanism of Fig. 11, by the differential action of two power cylinders 126a, 126b, having their piston rods 132, 133, connected respectively at the end and to an intermediate portion of the elevator shifting lever 127. These cylinders are connected by branches 134, 135, with suction line 106, the first of which has in it a restricting valve 136.

With increase of suction resulting from a diving angle, the lower cylinder 126b, will act first, thrusting outward on the intermediate portion of lever 127, with the connection 137, at the upper end of the lever moving slower or pausing to serve as a floating fulcrum. A more or less sudden corrective movement is thus applied to the elevators and as suction becomes more effective in the upper cylinder 126a, this corrective movement is arrested and slowed down until the differential pressure as between the cylinders is equalized. In the return or opposite adjustment the first part of the corrective movement is more rapid and then again as pressure is equalized in the two cylinders, the adjustment is eased off as the craft is returned to the desired normal flying attitude.

Fig. 13 illustrates another modification of the Fig. 11 construction, in which operation of the power cylinder 126, is governed from a sensitive control valve 138, similar to the turn controlled valve 25 in Fig. 4. The suction lines controlled by this valve are designated 41a and 42a, and are shown connected directly with opposite ends of power cylinder 126. The action of this valve is effected by rocking the valve element through a projecting lever arm 139, connected by link 140, with a collapsible Sylphon bellows 141, subjected through line 142, to suction of venturi 40a.

In this construction, the Sylphon acts as an amplifier to effect an immediate adjustment of the valve with relatively small changes in suction pressure resulting from increased or decreased speed from diving or climbing angles, easing off the extent of such adjustment as corrections are effected and the ship is returned to normal flying attitude.

Fig. 14 illustrates a modification of the Fig. 13 construction similar to the differential action effected in Fig. 12. In this case, there are two Sylphons 141a, 141b, similar to the two cylinders 126a, 126b, Fig. 12, with the differential action of the same controlled by the restricting valve 136a, which causes the Sylphon 141b, to act first on the intermediate part of lever 127a, which in this instance, acts through link 140, upon the sensitive control valve 138a, the differential Sylphon 141a, carrying the floating fulcrum 137a, acting later by reason of restriction 136a, to ease off the control as the corrective adjustment is completed.

Fig. 15 illustrates how the fore and aft control may be effected through a form of control similar to that utilized for lateral stability control shown in Fig. 8. In this case, the valve indicated at 93a, is placed longitudinally, so that with a forward and downward inclination, the valve element will be shifted by the weighted diaphragms forwardly, comparable with an inclination to the right in Fig. 9, to apply increased suction through line 115a, connected with the forward end of power cylinder 126, and reduced suction through line 116a, to the rearward end of the same cylinder, causing forward movement of the piston and lifting of the elevators to bring the ship back into longitudinal trim.

With this construction, the automatic control is initiated immediately upon change in fore and aft attitude without waiting for the change in suction occasioned by increase or decrease in speed following on the change in longitudinal attitude.

The control valve is indicated as adjustable about an intermediate transverse mounting axis 143, being set at the proper fore and aft attitude by means of a positioning segment 144. Once secured in proper position, this valve will instantly detect and react to any changes in longitudinal attitude and initiate the proper corrections to bring the ship back to the desired fore and aft flying position.

Fig. 16 illustrates how the structure of Fig. 15 may be modified by employing a Sylphon 141c, similar to that indicated in Fig. 13, for rocking the valve 93a, about its axis 143, to intensify or amplify the first portion of the corrective adjustment.

Also a differential control effect is introduced in this case by subjecting the inner faces of the two diaphragms to differential pressure through lines 145, 146, the latter of which has an interposed restrictive valve 147. These differential suction lines may be connected in the vent ports 145a, 146a, Fig. 10, and the two lines may be jointly connected with the suction line 142, from the second venturi 40a, Fig. 16. An adjustable spring is indicated at 148, for balancing the valve against the Sylphon 141c, so that in normal flight the valve element will occupy a neutral control position.

In this Fig. 16 construction, the change from proper longitudinal flying position will effect operation of the valve from the action of the weighted diaphragms, increased through tilting of the valve from the Sylphon, which responds to change in suction through increase or decrease in speed resulting from the change in flying attitude. In addition, the differential pressure effected on the diaphragms amplifies and then eases off the controlling effect after the manner of the floating fulcrum differential cylinders and differential Sylphons shown in Figs. 12 and 14.

Gages or indicators may be provided where it may be desirable, to provide some indication of operation of the various parts. In particular, a gage of the differential pressure type may be connected off the differential pressure lines 57, 58, Fig. 4, substantially as indicated at 149, which will indicate at all times the coordinated control effect of the turn sensitive instrument, the acceleration controlled device and the turn integrating means. The gyro or rate of turn instrument may be equipped with a suitable pointer or indicator, substantially as represented by the row of dials appearing at the left in Fig. 3.

The various devices for controlling direction of movement around one or more axes may be combined or be used separately, depending to some extent on the degree of automatic control suitable to or desired for a particular form of dirigible craft.

Any desired degree of sensitivity may be obtained so that comparatively small movements of the change detecting instruments may be amplified to produce correspondingly greater movements in the actual control mechanism, as for instance, by varying the leverage relations between the change sensitive instruments and the valves actuated thereby. The invention may readily be combined with the control mechanism of existing aircraft without interfering with the manual control or in turn being restricted or interfered with by such manual control. Thus as illustrated in Fig. 4, the automatic control mechanism does not interfere with manual operation of the controls which direct the craft and in its action is not required to operate the various controlling devices, such as the rudder pedals and the like, which otherwise might interfere with sensitivity of the apparatus.

To enable the pilot to make sudden rudder adjustments without first rendering the automatic control inoperative as by opening the differential pressure balancing valve 65, the piston 60 in the power cylinder may have oppositely acting spring closed relief valves therein, such as indicated at 150, 151, Fig. 4.

In Figs. 11, 12, 13, 14, 15, and 16, the speed sensitive characteristic of venturis 40a has been used for control purposes. Other speed sensitive means, such as Pitot tubes may be used with appropriate changes in connections. Many other changes may be made to meet different conditions and requirements, all within the true spirit of the invention and the claims are to be read accordingly.

What is claimed is:

1. In combination with dirigible craft provided with means for directing the same, power mechanism for actuating said directing means and means sensitive to turn of the craft, means for integrating the extent of turn and a separate device sensitive to acceleration, all connected to conjointly control operation of said power mechanism.

2. In combination with dirigible craft provided with means for directing the same, a turn sensitive instrument, an acceleration controlled instrument responsive to all values of acceleration, turn integrating means, connections between said three instrumentalities for modifying the effect of each by the others and power mechanism operable according to the conjoint effect of the three instrumentalities and connected to control said directing means.

3. In combination with dirigible craft provided with directing means, a turn sensitive instrument, an inertia mass balanced for free movement about the axis of turn, power mechanism for actuating said directing means and controlling connections from said turn sensitive means and inertia mass to said power mechanism.

4. In combination with dirigible craft provided with directing means, a turn sensitive instrument, an inertia mass balanced for free movement about the axis of turn, power mechanism for actuating said directing means, controlling connections from said turn sensitive means and inertia mass to said power mechanism and including valves operable by said turn sensitive instrument and inertia mass respectively and pneumatic connections from said valves to said power mechanism.

5. In combination with dirigible craft provided with means for directing the same, a turn sensitive instrument, an acceleration controlled instrument, turn integrating means, connections between said three instrumentalities for modifying the effect of each by the others, power mechanism operable according to the conjoint effect of the three instrumentalities and connected to control said directing means and means for indicating the conjoint action of said three instrumentalities.

6. In combination with dirigible craft provided with directing means, power mechanism for actuating said directing means, turn sensitive means connected to exert a control over said power mechanism, turn integrating means connected to modify the control influence of said turn sensitive means in accordance with the extent of turn, said turn sensitive means including a valve, differential pressure lines controlled thereby and said turn integrating means including differential pressure tanks connected with said differential lines and restricting orifices for timing the effect of said differential pressure tanks.

7. In combination with dirigible craft provided with means for directing the same about a vertical axis, an acceleration controlled mass on the craft mounted for free movement about a vertical axis, power mechanism for actuating said directing means, controlling connections from said acceleration controlled mass to said power mechanism and turn sensitive means connected to modify the control effect of said acceleration controlled mass.

8. In combination with dirigible craft provided with means for directing the same about a vertical axis, an acceleration controlled mass on the craft mounted for free movement about a vertical axis, power mechanism for actuating said directing means, controlling connections from said acceleration controlled mass to said power mechanism, turn sensitive means connected to modify the control effect of said acceleration controlled mass and turn integrating means connected to modify the control effect of both said turn sensitive means and said acceleration controlled mass.

9. In combination with a dirigible craft having a rudder, automatic means for operating said rudder and manual control means including rudder pedals movable to an inoperative position when pressure is removed therefrom and connections from said pedals constructed and arranged to slack off, when the pedals are in inoperative position, sufficiently to permit said automatic means to assume full control of the rudder.

10. In combination with aircraft having rudder and aileron control, automatic means for effecting the rudder control and adjustable pickup mechanism for effecting aileron control after a predetermined operation of said rudder control.

11. In combination with aircraft having rudder and aileron control, automatic means for effecting the rudder control and adjustable pickup mechanism for effecting aileron control after a predetermined operation of said rudder control and means for rendering said pickup mechanism effective or ineffective at will.

12. In combination with aircraft provided with means for controlling lateral stability, a transversely disposed horizontally extending valve having connected weighted diaphragms and a valve body shifted laterally thereby in accordance with lateral deviations of the craft and differential pressure connections controlled by said valve body and arranged to exert a control effect over said lateral stability controlling means.

13. In combination with aircraft provided with longitudinal stability controlling means, a longitudinally disposed valve on said craft and having connected weighted diaphragms and a valve body shifted thereby in accordance with variations in longitudinal trim of the craft and differential pressure connections controlled by said valve body and arranged to exert a controlling influence on said longitudinal stability controlling means.

14. In combination with aircraft provided with longitudinal stability controlling means, a longitudinally disposed valve on said craft and having connected weighted diaphragms and a valve body shifted thereby in accordance with variations in longitudinal trim of the craft and differential pressure connections controlled by said valve body and arranged to exert a controlling influence on said longitudinal stability controlling means, said valve being mounted for tilting movement about a transverse axis and means for effecting tilting adjustments of said valve about said axis.

15. In combination with dirigible craft provided with directing means, differential pressure power cylinders differentially connected with said directing means and means for controlling operation of said differential power cylinders in accordance with deviation from predetermined flying attitude.

16. In combination with dirigible craft provided with directing means, power mechanism for controlling said directing means, differential pressure valve means for controlling said power mechanism and pressure operated Sylphon bellows mechanism connected to effect operation of said differential valve, said mechanism including two differentially connected Sylphon bellows having a floating fulcrum leverage connection with said differential valve.

17. In combination with aircraft adjustable about the transverse horizontal axis and provided with control means for determining the longitudinal trim of the craft, power mechanism for actuating said control means differential pressure valve means for controlling said power mechanism, means sensitive to air speed and connected with said differential pressure valve means for providing the force to actuate said power mechanism and means sensitive to air speed for controlling said differential pressure valve means.

18. In combination with aircraft provided with means for controlling the stability thereof about a desired axis, a valve having weighted diaphragms and a valve body shifted in accordance with deviations about said axis, and differential pressure means controlled by said valve for regulating said stability controlling means.

19. In combination a dirigible craft provided with means for controlling the same with respect to a particular axis, pneumatic power means connected to actuate said control means, a venturi, connections between said venturi and power means including a differential pressure control valve and valve means between said venturi and differential pressure control valve for opening said connections to atmosphere.

20. In combination with a dirigible craft provided with means for controlling the same with respect to a particular axis, power mechanism including cooperative but independently acting devices for actuating said control means and speed responsive means connected with said cooperative but independently acting device and controlling same for automatically effecting first a rapid major adjustment of said control means and then a slower reduced adjustment of said control means.

21. In combination with a dirigible craft provided with means for controlling the same in respect to a particular axis, power mechanism including cooperative but independently acting devices for effecting adjustment of said control means and means sensitive to air speed of said craft and connected with said cooperative independently acting devices for automatically effecting first a sudden major actuation of said power mechanism and then a slower lesser actuation of the same.

LUIS DE FLOREZ.